United States Patent

Horneman et al.

(10) Patent No.: US 8,837,732 B2
(45) Date of Patent: Sep. 16, 2014

(54) METHOD AND DEVICE FOR DATA PROCESSING IN A WIRELESS NETWORK

(75) Inventors: Kari Veikko Horneman, Oulu (FI); Vinh Van Phan, Oulu (FI); Ling Yu, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/521,875

(22) PCT Filed: Jan. 14, 2010

(86) PCT No.: PCT/EP2010/050391
§ 371 (c)(1),
(2), (4) Date: Aug. 21, 2012

(87) PCT Pub. No.: WO2011/085810
PCT Pub. Date: Jul. 21, 2011

(65) Prior Publication Data
US 2012/0314866 A1 Dec. 13, 2012

(51) Int. Cl.
*H04W 12/04* (2009.01)
(52) U.S. Cl.
USPC ........... 380/270; 370/228; 370/229; 370/230; 370/231; 455/410; 455/411; 713/155; 726/3
(58) Field of Classification Search
USPC ........ 380/270; 713/155; 726/3; 370/228–231
See application file for complete search history.

(56) References Cited

U.S. PATENT DOCUMENTS

| 8,213,360 | B2* | 7/2012 | Koskela et al. | 370/328 |
| 8,353,054 | B2* | 1/2013 | Nguyen et al. | 726/30 |
| 8,400,935 | B2* | 3/2013 | Pelletier et al. | 370/252 |
| 2002/0009199 | A1* | 1/2002 | Ala-Laurila et al. | 380/247 |
| 2008/0037487 | A1* | 2/2008 | Li et al. | 370/338 |
| 2008/0051117 | A1* | 2/2008 | Khare et al. | 455/458 |
| 2009/0280781 | A1* | 11/2009 | Li et al. | 455/412.1 |
| 2009/0325480 | A1* | 12/2009 | Ji et al. | 455/8 |
| 2010/0165882 | A1* | 7/2010 | Palanki et al. | 370/254 |

FOREIGN PATENT DOCUMENTS

WO    WO 01/13666    2/2001

OTHER PUBLICATIONS

Zhang Jinfeng, Niu Jianwei, He Rui, Hu Jianping, School of Computer Science and Engineering P2P-Leveraged Mobile Live Streaming, 2007, pp. 1-6.*
Doppler, K., et al., "Device-to-Device Communication as an Underlay to LTE-Advanced Networks", © 2009 IEEE, 8 pgs.
Zugenmaier, A., et al., "Security Technology for SAE/LTAE", DoCoMo Technical Journal, vol. 11. No. 3, Sep. 1, 2009, 4 pgs.
Doppler, K., et al., "Device-to-Device communications. Functional prospects for LTE-Advanced networks", © 2009 IEEE, 6 pgs.

* cited by examiner

*Primary Examiner* — Mohammad A Siddiqi
(74) *Attorney, Agent, or Firm* — Harrington & Smith

(57) ABSTRACT

A method and a device for data processing in a wireless network are provided, wherein a direct connection between two mobile terminals is set up based on a seed information provided by the wireless network. Furthermore, a communication system is suggested including at least one such device.

11 Claims, 2 Drawing Sheets

METHOD AND DEVICE FOR DATA PROCESSING IN A WIRELESS NETWORK

The invention relates to a method and to a device for data processing in a wireless network. Further, a communication system comprising at least one such device is suggested.

The solution described herein applies to any mobile communication system, e.g., 3GPP LTE-A Release 10 and beyond.

A (mobile cellular) device-to-device (D2D) communication comprises, e.g., mobile-to-mobile (M2M), machine-to-machine (M2M), terminal-to-terminal (T2T) or peer-to-peer (P2P) communication. This kind of mobile cellular D2D communications is also referred to as "D2D" and may be assumed using licensed radio spectrum under supervision and control of supporting cellular systems. D2D may use the same radio resources as do the supporting cellular systems.

A motivation or purpose for providing direct D2D communications in a cellular network is to reduce transmitter power consumption on both the device and the network side, to improve a spectrum efficiency, to increase the cellular network's capacity and coverage, and to create and support more services for the users in an efficient way.

In mobile communication systems, the same radio resources shall be used supporting conventional communication along the network paths as well as direct D2D communication, wherein the D2D resource allocation should preferably be under control of the cellular system to avoid significant interference between cellular and D2D users. However, known regular resource allocation, monitor- and control mechanisms in current cellular networks are not designed for localized and distributed D2D communication, wherein user data and a portion of control data transmissions occur directly between two or multiple mobile terminals (UEs). As a particular UE is not a trusted entity from the perspective of the operator's network, allowing the UE to communicate directly over allocated resources may create a threat of unauthorized usage of radio resources. For instance, once a direct D2D connection is set up and has allocated resources, D2D users may continue using these allocated resources as long as they like.

In addition, confidentiality of the radio resource allocation information may be an issue as malicious users may be able to eavesdrop on the D2D communication if no strong security protection between UEs that conduct direct D2D communication over allocated radio resources is used.

The problem to be solved is to overcome the disadvantages mentioned above and in particular to allow for an efficient and secure D2D communication.

This problem is solved according to the features of the independent claims. Further embodiments result from the depending claims.

In order to overcome this problem, a method for data processing in a wireless network, in particular in an LTE network, is provided,
wherein a direct connection between two mobile terminals is set up based on a seed information provided by the wireless network.

Said seed information can be any mobile terminal specific information determined by, e.g., a base station or any other component of the wireless network. The seed information allows the mobile terminal to communicate, e.g., convey data, across a direct D2D connection.

It is noted that this approach applies to more than two mobile terminals as well. In particular, at least two mobile terminals may utilize a direct D2D communication based on the seed information that is conveyed by the wireless network.

It is further noted that the wireless network may comprise at least one base station, in particular several base stations. The base stations may be adjacent or remote to one another. Also, the base stations may be driven by at least one operator, in particular by different operators.

Advantageously, this solution enables a network-assisted synchronized ciphering key update mechanism to support secure resource allocation and usage for direct D2D communication.

The wireless network may in particular be a 3GPP LTE-A Release 10 and beyond network.

In an embodiment, the seed information is provided by at least one base station of the wireless network.

Various kinds of base station interaction could be utilized in order to synchronize and/or coordinate seed information (and/or resource information) to be conveyed to the mobile terminals.

According to a further embodiment, several base stations synchronize a duration of a validity period for the direct connection.

Hence, in case the mobile terminals are connected to different base stations, interaction between the base stations is provided that allows for setting up the same validity period of the direction connection that is utilized at both mobile terminals. Therefore, the validity period or valid time interval of the direct connection is synchronized even in case the mobile terminals are attached to or served by different base stations or operators.

In another embodiment, the wireless network allocates resources for the direct connection between the two mobile terminals and in particular conveys resource allocation information together with the seed information.

Advantageously, the wireless network thus supervises and controls its resources and could determine, e.g., billing information for at least one mobile terminal sharing said direct D2D communication.

In a further embodiment, ciphering keys are derived based on said seed information at each of the mobile terminals.

In a next embodiment, the ciphering keys are used to cipher and decipher data conveyed across the direct connection of the two mobile terminals.

It is also an embodiment that
each mobile terminal comprises a random generator which is synchronized with a random generator at the wireless network;
the ciphering keys are derived based on the seed information for the respective mobile terminal and a random number provided by the random generator of the mobile terminal.

The wireless network, e.g., the base station, is aware of the random number that is locally generated at each mobile terminal (associated with this wireless network or base station), because the wireless network comprises the "same" random generator as does the respective mobile terminal. In other words, the random generator of the mobile terminal is synchronized with the random generator of the wireless network (base station) to which it is attached. Hence, the wireless network can determine individual seed information for each mobile terminal in a way that both mobile terminals derive the same ciphering key from the seed information and the random number that is (also) locally generated at the mobile terminal.

It is noted that the random number may be any random or pseudo-random number or sequence.

Pursuant to another embodiment, the network determines the seed information for each of the mobile terminals such that the ciphering keys derived by the mobile terminals are identical.

According to an embodiment, an individual seed information is provided for each terminal.

According to another embodiment, the seed information is associated with a validity period.

Hence, the seed information is valid for a predefined period of time. After the validity period is over, the seed information and the ciphering key generated become invalid and—in case the direct connection between the mobile terminals is to be maintained—the wireless network needs to provide another seed information. The seed information and thus the ciphering key may become invalid, because of a new random number being (autonomously) generated. Hence, after the validity period is over, a new random number may be autonomously generated at the mobile terminal.

It is also an embodiment that such validity period is provided by a system parameter.

For example, the time interval of the validity period may be configured for the operation of the (synchronized and autonomous) random generator; then, an update of the seed information can be triggered and thus the validity period may be reset or renewed.

Pursuant to yet an embodiment, an update of the validity period is initiated by at least one mobile terminal or by the network, in particular by a base station of the network.

Hence, any of these components may trigger such a renewal or reset of the validity period.

The validity period also refers of a time interval during which the ciphering key derived from the seed information is valid.

As per another embodiment the validity period is configured via a broadcast system information of the network, in particular a cell or the wireless network or a base station.

It is also an embodiment that the validity period is configured via a dedicated connection to an established direct connection (direct D2D communication).

Hence, the mobile terminals of the direct connection can be reached by such dedicated configuration.

According to yet an embodiment, the wireless network is a 3GPP wireless network, in particular according to an 3GPP LTE-A or an upcoming specification or standard.

The problem stated above is also solved by a device for data processing in a wireless network, comprising or being associated with a processing unit that is arranged
 for providing a seed information for setting up a direct connection between two mobile terminals.

According to an embodiment, said device is a device of the network, in particular a base station (e.g., an eNB) or a base station controller.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

This mechanism described herein uses designated synchronized-and-autonomous random generators and dynamic seed distribution from the network to generate and update ciphering keys.

The mechanism further enforces a regular updating of security and resource allocation for conducting proper direct D2D communications. Hence, the network may take control of the resource allocation of direct D2D communication and therefore may define and apply charging for the UEs that participate in direct D2D communication.

Upon setup of a D2D connection, each UE involved in the D2D communication can be configured by the network (e.g., the controlling eNB), wherein such configuration comprises a designated synchronized-and-autonomous random generator with identical autonomous updating intervals T (also referred to as (time) intervals T).

Each UE comprises such random generator, which generates a new designated random number (or sequence) every interval T autonomously and independently from each other. The synchronization is ensured due to each of the UEs the network (e.g., the controlling eNB) keeping the same corresponding random generator synchronized with the random generator operated in the UE utilizing established cellular-access (downlink) and D2D synchronization means. Hence, because of the random generators being synchronized between the UE and the network, the network is aware of the random number generated at the UE by its random generator.

It is noted that the random number referred to herein may be any number or sequence that is generated according to an according algorithm. In this regard, the random number or sequence does not have to actually meet all requirements of a true random number, but may also be a pseudo-random number or sequence that appears to be generated somewhat randomly. Various functions that are supported by a processing unit can be supported and utilized as a random number or sequence by the approach provided herein.

The same random number (or sequence) may be generated by the pair of corresponding random generators in the UE and in the network at (substantially) the same time (e.g., at the starting system frame number (SFN) or transmission timing interval (TTI) of each synchronized interval T). In other words, the network configures and controls, thus being fully aware of, the synchronized-and-autonomous operation of the random generator in each of the UEs.

The interval T may be considered as a semi-static reconfigurable parameter, specified for regular updating of the ciphering key and resource allocation between the network and the UEs for direct D2D communications. The duration interval T may correspond to a multiple number of system frames of the serving cellular system.

Figure 1:
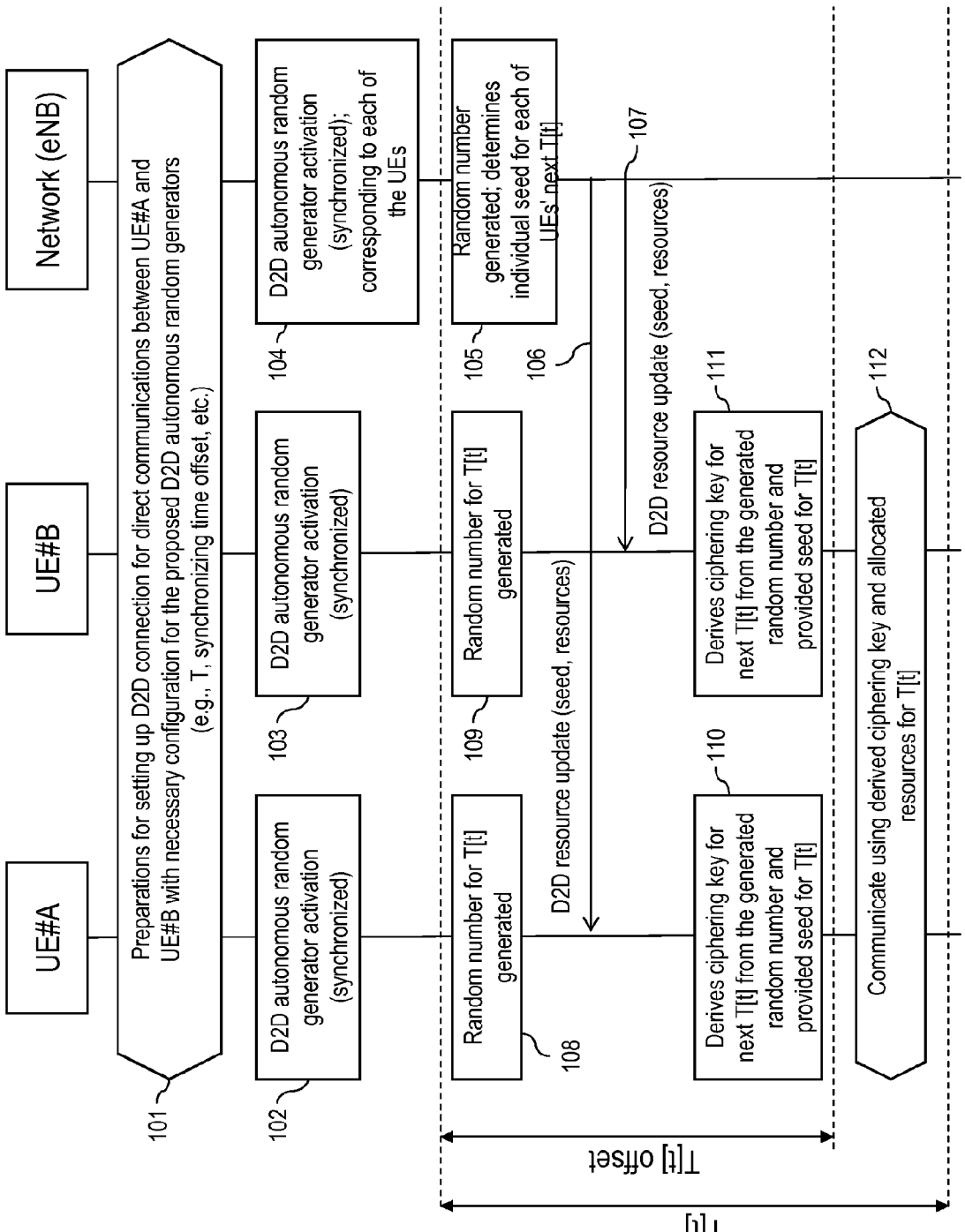
FIG. 1 shows a schematic message flow diagram visualizing a network-assisted synchronized ciphering key updating mechanism that can be used for an efficient direct D2D communication.

FIG. 1 shows a schematic message flow diagram visualizing a network-assisted synchronized ciphering key updating mechanism that can be used for efficient direct D2D communication.

FIG. 1 comprises mobile terminals UE#A and UE#B and a base station eNB (which exemplarily represents the wireless network). In a step 101 preparations for setting up a direct D2D communication between the mobile terminals UE#A and UE#B are made, random generators to be used for direct D2D communication are configured, e.g., random generator, interval T, synchronizing time offset, or the like are determined and/or communicated.

In a step 102, the direct D2D autonomous random generator of the mobile terminal UE#A is activated; in a step 103, the direct D2D autonomous random generator of the mobile terminal UE#B is activated. In a step 104 the direct D2D autonomous random generator of the base station eNB is activated, which corresponds to the random generators of each of the mobile terminals UE#A and UE#B. The random generators at the mobile terminals UE#A and UE#B are synchronized with the random generator of the base station eNB.

The interval T may also be referred to as interval T[t], wherein after a time period t, a new interval T may start. In other words, [t] indicates a particular time interval T.

For each updating interval T[t] during direct D2D communications, a random number is generated (according to the random number generated at each mobile terminal due to the synchronized random generators) and an individual dynamic seed S#A[t], S#B[t] is determined by the base station eNB for each mobile terminal's updating interval T[t] (see step 105).

A resource allocation message 106 conveys a resource update comprising the seed S#A[t] generated for the mobile terminal UE#A as well as resources to the mobile terminal UE#A. Accordingly, a resource allocation message 107 conveys a resource update comprising the seed S#B[t] generated for the mobile terminal UE#B as well as resources to the mobile terminal UE#B.

In a step 108, a random number R#A[t] for the updating interval T[t] is generated by the mobile terminal UE#A and in a step 109, a random number R#B[t] for the updating interval T[t] is generated by the mobile terminal UE#B. It is noted that the random numbers mentioned in steps 105, 108 and 109 may be generated substantially at the same time (or with a minor delay).

Based on the provided seed S#A[t] and the random number R#A[t] generated autonomously, the mobile terminal UE#A may derive a valid ciphering key K[t] to conduct a direct D2D communication with the mobile terminal UE#B during the time interval T[t] (see step 110). Accordingly, based on the provided seed S#B[t] and the random number R#B[t] generated autonomously, the mobile terminal UE#B may derive the valid ciphering key K[t] to conduct a direct D2D communication with the mobile terminal UE#A during the time interval T[t] (see step 111).

Then (see step 112) the mobile terminals UE#A and UE#B can use the derived ciphering key K[t] and the allocated resources to communicate during the (remaining) time interval T[t]. An offset duration of the time interval T[t] indicates a duration until direct D2D communication is possible.

The dynamic seed S#A[t], S#B[t] provided to each mobile terminal UE#A, UE#B is different, but has a certain dependency corresponding to the generated random numbers in order to ensure that the involved mobile terminals UE#A and UE#B conducting direct D2D communication generate the same ciphering key K[t].

Hence, the ciphering key K[t] can be defined as a function of the individual seed S#A[t], S#B[t] (referred to as S#[t]) and the individual random number R#A[t], R#B[t] (referred to as R#[t]):

$$K[t]=f(S\#[t],R\#[t]). \quad (1)$$

The network, e.g., the base station eNB, may select the seed S#A[t] for the mobile terminals UE#A (it is noted that the base station eNB may also select the seed S#B[t] for the other mobile terminal UE#B as a starting point). Then, the ciphering key can be determined as follows:

$$K[t]=f(S\#A[t],R\#A[t]). \quad (2)$$

The individual seed S#B[t] for the other mobile terminal UE#B can be determined by the reversed argument function as follows:

$$S\#B[t]=\arg\{f(S\#B[t],R\#B[t])=K[t]\}. \quad (3)$$

As the base station eNB is aware of the individual random numbers R#A[t] and R#B[t] also generated at the respective mobile terminals UE#A and UE#B, the base station eNB can determine the individual seed S#B[t] based on the ciphering key K[t] according to equation (2) above. Hence, the mobile terminal UE#B derives the same ciphering key K[t] as does the mobile terminal UE#A, because the seed S#B[t] has been determined such that a combination according to equation (1) with the random number R#B[t] leads to exactly this ciphering key K[t].

The base station eNB may signal the updated and calculated seeds S#A[t] and S#B[t] to the mobile terminals UE#A and UE#B, respectively.

Upon receiving the dynamic seed value, the same ciphering key for direct D2D communication for the time interval T[t] can be generated at each of the D2D UEs. The ciphering key K[t] validates usage of the allocated resources for the interval T[t]. After the interval T[t] has lapsed, each random generator will autonomously generate a new random number that renders the previously generated ciphering key invalid. Hence, a new update from the network, e.g., base station eNB, is required.

If further resources are required to extend the time of the direct D2D communication, additional seeds may be calculated by the network and be provided to the UEs to enable another ciphering key generation.

It is noted that in case the UEs involved in direct D2D communications are connected to different (adjacent) cells and are being served by different eNBs, inter-base station interactions could be used to facilitate the proposed network-assisted synchronized ciphering key update mechanism.

Furthermore, a UE-initiated resource update request, explicit or in form of a status reporting indication, may be supported as an alternative or in addition to the above mentioned network-initiated updating mechanism. This enables a robust control of the direct D2D communication according to actual requirements regarding the UE's resources.

Figure 2:
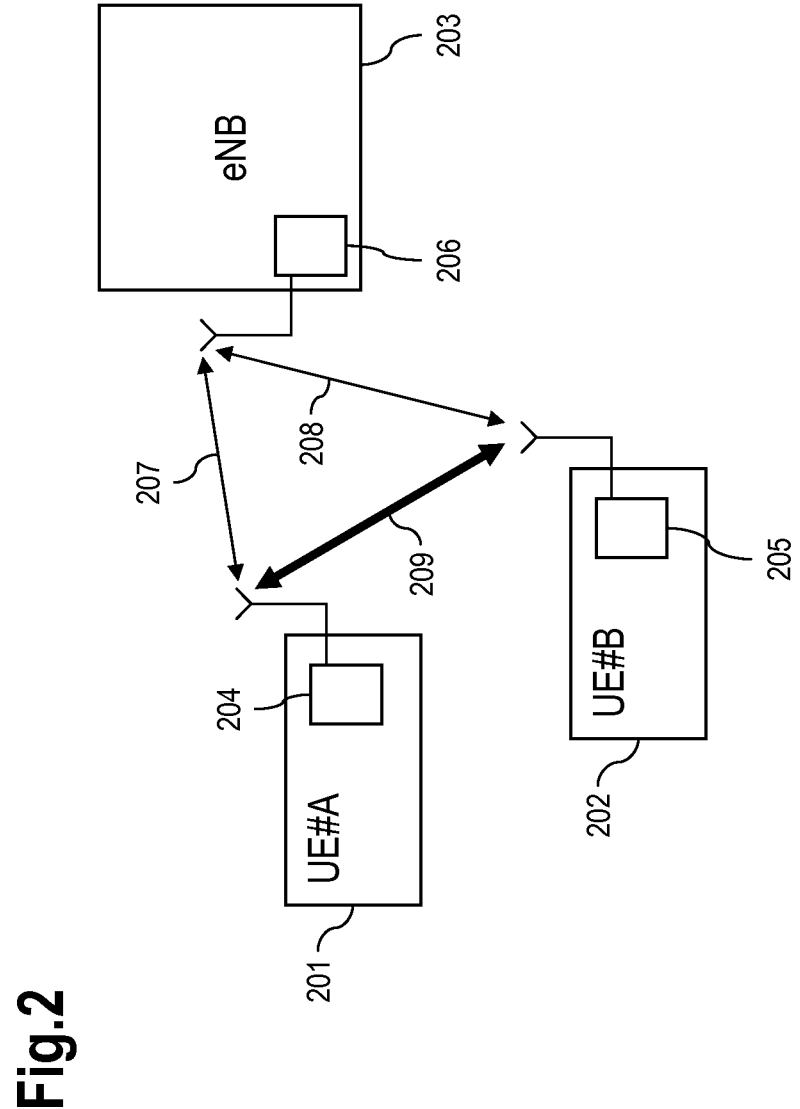
FIG. 2 shows a schematic block diagram comprising two mobile terminals and a base station eNB.

FIG. 2 shows a schematic block diagram comprising two mobile terminals 201, 202 and a base station eNB 203.

Each of the mobile terminals 201, 202 and the base station eNB 203 comprises a processing unit 204, 205, 206 in particular with an antenna, which may be part of or associated with a transceiver unit for exchanging information over a wireless interface.

The base station eNB 203 may exchange information 207 with the mobile terminal 201 and information 208 with the mobile terminal 202. Such information 207, 208 may comprise information for setting up a direct D2D communication, signaling resources and/or seed information.

Based on the information 207, 208 obtained by the base station eNB 203, the mobile terminal 201 and the mobile terminal 202 may enter a direct D2D communication 209. This direct D2D communication may be valid for a given period of time (which can be set by the base station eNB 203).

It is noted that instead of one base station, several base stations may be involved (not shown in FIG. 2) serving and conveying information towards the mobile terminals. Inter-base station interaction may be required in order for the different base stations to synchronize and/or to relay the required information towards the mobile terminals such that the mobile terminals may utilize direct D2D communication. The different base stations may be associated with different cells and/or operators.

It is noted that the block structure shown in FIG. 2 could be implemented by a person skilled in the art as various physical units, wherein the mobile terminals 201, 202 or the eNB 203 could be realized each as at least one logical entity that may be deployed as hardware, program code, e.g., software and/or firmware, running on a processing unit, e.g., a computer, microcontroller, ASIC, FPGA and/or any other logic device.

The functionality described herein may be based on an existing component of a (wireless) network, which is extended by means of software and/or hardware. The eNB mentioned herein could also be referred to as any base station pursuant to any communication standard.

The base stations may each comprise at least one physical or logical processing unit that is arranged for providing a seed information that can be used for setting up and/or configuring, in particular for generating a ciphering key or an updated ciphering key to be used for a direct connection between two mobile terminals.

Advantageously, the approach provided allows for a further protection of direct D2D communication by introducing a synchronized and distributed random generator based security update mechanism. Without a correct ciphering or deciphering key, direct D2D users are not able to decrypt the data even though they may continue using the allocated resources for transmission and/or reception. Therefore, the mechanism reduces the risk of an unauthorized usage of radio resources.

LIST OF ABBREVIATIONS

3GPP Third Generation Partnership Project
D2D Device-to-Device
eNB evolved NodeB (base station)
LTE Long Term Evolution
LTE-A LTE Advanced
SFN System Frame Number
TTI Transmission Timing Interval
UE User Equipment (mobile terminal)

The invention claimed is:

1. A method comprising:
    establishing a direct connection between two mobile terminals for data processing in a wireless network, wherein the establishing is based on a seed information provided by the wireless network, wherein an individual seed information is provided for each terminal, and wherein each mobile terminal comprises a random generator which is synchronized with a random generator at the wireless network; and
    deriving ciphering keys based on the seed information at each of the mobile terminals, wherein the ciphering keys are derived based on the seed information for the respective mobile terminal and a random number provided by the random generator of the mobile terminal, wherein the individual seed information provided has a dependency corresponding to the generated random number.

2. The method according to claim 1, wherein the seed information is associated with a validity period.

3. The method according to claim 1, wherein the wireless network is a 3GPP wireless network, in particular an LTE-A network.

4. A computer program product embodied on a non-transitory computer-readable medium in which a computer program is stored, which when executed by a computer, the computer program product is configured to provide instructions to control or carry out a method according to claim 1.

5. A method comprising:
    establishing a direct connection between two mobile terminals for data processing in a wireless network, wherein the establishing is based on a seed information provided by the wireless network, wherein an individual seed information is provided for each terminal, and wherein each mobile terminal comprises a random generator which is synchronized with a random generator at the wireless network; and
    deriving ciphering keys based on the seed information at each of the mobile terminals and a random number provided by the random generator of the mobile terminal, wherein the individual seed information provided has a dependency corresponding to the generated random number, wherein the network determines the seed information for each of the mobile terminals such that the ciphering keys derived by the mobile terminals are identical.

6. The method according to claim 5, wherein an individual seed information is provided for each terminal.

7. The method according to claim 5, wherein the seed information is associated with a validity period.

8. The method according to claim 5, wherein the wireless network is a 3GPP wireless network, in particular an LTE-A network.

9. A computer program product embodied on a non-transitory computer-readable medium in which a computer program is stored, which when executed by a computer, the computer program product is configured to provide instructions to control or carry out a method according to claim 5.

10. An apparatus comprising:
    a random generator
    at least one processor, and
    at least one memory including computer program code,
    the at least one memory and the computer code configured to, with the at least one processor, cause the apparatus to at least perform the following:
        providing a seed information for establishing a direct connection between two mobile terminals for data processing in a wireless network, wherein each mobile terminal comprises a random generator which is synchronized with the random generator in the apparatus, and wherein an individual seed information is provided for each terminal; and
        determining the seed information for each of the mobile terminals and a random number provided by the random generator of the mobile terminal, wherein the individual seed information provided has a dependency corresponding to the generated random number such that the ciphering keys derived by the mobile terminals are identical.

11. The apparatus according to claim 10, wherein the apparatus is a base station or a base station controller.

* * * * *